(12) United States Patent
Beaudet et al.

(10) Patent No.: US 6,189,441 B1
(45) Date of Patent: Feb. 20, 2001

(54) KITCHEN ROBOT WITH TWO OUTPUT CONNECTIONS FOR REMOVABLE WORKING ACCESSORIES

(75) Inventors: Jean-Yves Beaudet, Haleine; Marc Marriere, Ambrieres les Vallees, both of (FR)

(73) Assignee: Moulinex S.A., Paris (FR)

( * ) Notice: Under 35 U.S.C. 154(b), the term of this patent shall be extended for 0 days.

(21) Appl. No.: 09/367,225

(22) PCT Filed: Feb. 10, 1998

(86) PCT No.: PCT/FR98/00252

§ 371 Date: Sep. 30, 1999

§ 102(e) Date: Sep. 30, 1999

(87) PCT Pub. No.: WO98/34528

PCT Pub. Date: Aug. 13, 1998

(30) Foreign Application Priority Data

Feb. 11, 1997 (FR) .................................................. 97 01572

(51) Int. Cl.[7] ............................ A23N 1/02; A47J 43/046; A47J 43/06; A47J 43/08; A47J 43/07
(52) U.S. Cl. ............................ 99/492; 99/510; 241/37.5; 241/92; 241/282.1; 241/101.01; 366/291; 366/314; 366/601
(58) Field of Search ........................... 99/492, 509–513, 99/484; 366/291, 205, 297–300, 314, 601; 241/37.5, 92, 282.1, 282.2, 101.01, 101.2; 248/605, 612, 634

(56) References Cited

U.S. PATENT DOCUMENTS

| | | | |
|---|---|---|---|
| 3,713,628 | * | 1/1973 | Christensen ........................ 366/314 |
| 4,977,822 | * | 12/1990 | Seo et al. .............................. 99/348 |
| 5,447,371 | * | 9/1995 | Agapiou .............................. 366/290 |
| 5,460,082 | * | 10/1995 | Kooyker et al. ...................... 99/484 |
| 5,875,706 | * | 3/1999 | Borger et al. ......................... 99/492 |

FOREIGN PATENT DOCUMENTS

| | | |
|---|---|---|
| 0 556 897 | 8/1993 | (EP) . |
| 1161683 | 9/1958 | (FR) . |
| 1195797 | 11/1959 | (FR) . |
| 2123522 | 9/1972 | (FR) . |
| 2 631 535 | 11/1989 | (FR) . |
| 810485 | 3/1959 | (GB) . |

* cited by examiner

*Primary Examiner*—Timothy F. Simone
(74) *Attorney, Agent, or Firm*—Young & Thompson

(57) ABSTRACT

A kitchen robot comprises a housing (2) containing a motor unit (4) whose output shaft (6) vertically projects from the housing and with an upper face (10) for receiving a first removable accessory (22) comprising a bowl (33) housing a rotating implement (36) integral with a vertical shaft (38) coaxially coupled with the motor shaft (6). The housing has a base (12) run through by a driving shaft (14) connected to the motor shaft (6) by a belt hoisting mechanism (16) designed for receiving a second removable accessory (24). The bowl (33) is mounted movable on a base plate (50) run through by the motor shaft (6) and which, before the bowl is fixed, is mounted flatly adjustable on the housing (2) so as to be coaxial with the motor shaft (6), and is fixed on the housing (2) after being adjusted.

4 Claims, 2 Drawing Sheets

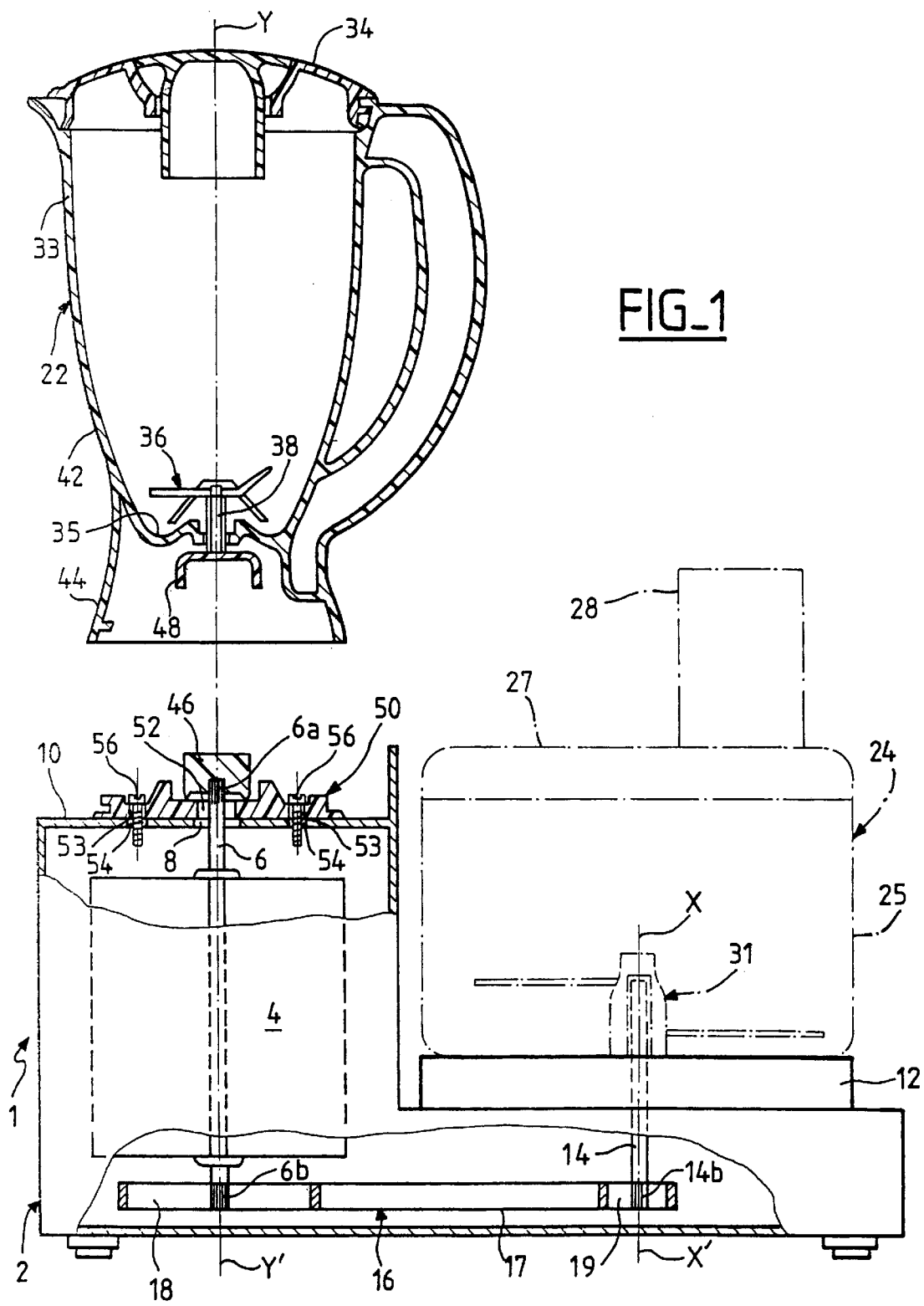
FIG_1

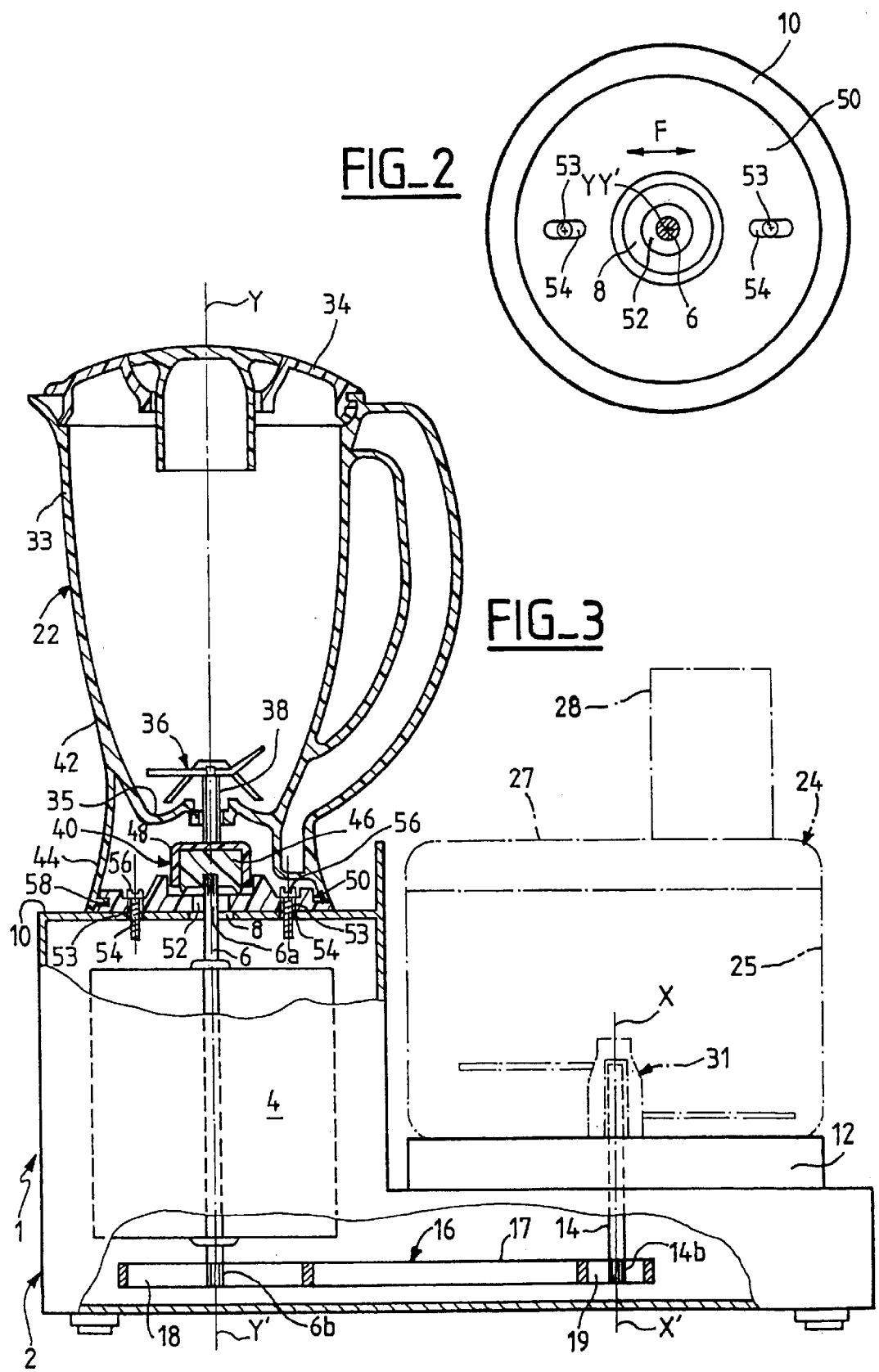

KITCHEN ROBOT WITH TWO OUTPUT CONNECTIONS FOR REMOVABLE WORKING ACCESSORIES

CROSS-REFERENCE TO RELATED APPLICATION

This is the 35 USC 371 national stage of international application PCT/FR98/00252 filed on Feb. 10, 1998, which designated the United States of America.

FIELD OF THE INVENTION

The present invention relates to kitchen robots adapted for the processing of foodstuffs and of the type comprising a housing which encloses a motor group having a first vertical drive shaft projecting from the housing and which comprises an upward surface adapted to receive a first removable work accessory comprising a bowl closed by a cover and containing a rotating work tool secured to a vertical shaft adapted to be coupled in rotation to the first drive shaft of the motor group, said housing having laterally a region forming a base outside of which vertically projects a second drive shaft which is connected in rotation to said first drive shaft by a transmission belt reducer mechanism and which is adapted to receive a second removable work accessory.

BACKGROUND OF THE INVENTION

Such a kitchen robot is an electric kitchen appliance with two outputs of which one is constituted by the upper surface of the housing beyond which projects the vertical shaft properly so-called of the motor group, and is adapted to receive interchangeably various accessories of the rapid output type, such as, for example, a mixer bowl or a coffee mill, and of which the other output is constituted by the region forming a base of the housing outside of which projects the other vertical drive shaft connected to the motor drive group by the belt reducer, and is adapted to receive a work accessory of the type comprising a removable receptacle in which are mounted various interchangeable rotating tools, such as for example a dicer, a vegetable slicer or a centrifuge.

In the construction of a known kitchen robot of this type, the vertical drive shaft projecting from the region forming a base of the housing is maintained fixed by any suitable holding system, and the motor group is fixed in the housing of the apparatus after adjustment of the tension in the transmission belt, the vertical shaft of the motor group projecting through a bore provided in the upper surface of the housing. When using the robot, the rapid output working accessory is generally maintained in place on the upper surface of the housing by means of a securement system of the bayonet type. However, as a result particularly of different adjustments of the tension of the transmission belt, the vertical shaft of the motor group, once fixed, will occupy a random position in the bore of the upper surface of the housing, such that, upon emplacing the rapid output work accessory, there is a relative eccentricity between the motor group shaft and the working tool shaft of this accessory, thus leading to important overheating, even a deterioration, of the shaft of the tool or its bearing during vibrations engendered for example by shocks or loads to which is subjected the shaft of the tool in the course of operation.

OBJECT OF THE INVENTION

The invention particularly has for its object to overcome these drawbacks and to provide a kitchen robot, of the type mentioned above, which ensures simply and at lowest cost, after mounting of the motor group, a perfect axial alignment between the motor group shaft and the shaft of the working tool of the rapid output accessory upon emplacement of this latter on the apparatus, and this regardless of the position occupied by the shaft of the motor group after mounting.

SUMMARY OF THE INVENTION

According to the invention, the bowl is removably mounted on a supporting base which is traversed by the first drive shaft of the motor group and which, before mounting of the bowl, is adjustably flatly mounted on the upper surface of the housing such that said base is coaxial with said first drive shaft of the motor group, and is fixed on the housing after adjustment.

Thus, it will be understood that as a function of the position taken by the motor group shaft after mounting of this latter, a simple adjustment of the supporting base, with the aid of a suitable adjusting tool, permits centering correctly this latter relative to the shaft of the motor group, and accordingly the two shafts, respectively, of the motor group and of the working tool of the rapid output accessory, are perfectly coaxial upon emplacement of this accessory on the supporting base. Moreover, this base constitutes a centering member which is less costly and perfectly adapted for mass production.

BRIEF DESCRIPTION OF THE DRAWINGS

The characteristics and advantages of the invention will become further apparent from the description which follows, by way of non-limiting example, with reference to the accompanying drawings, in which:

FIG. 1 is a schematic view partially in vertical cross-section of a kitchen robot according to the invention, before emplacement of a rapid output accessory, in this case a mixer bowl;

FIG. 2 is a schematic top plan view of a supporting base mounted in centered position on the housing of the robot of FIG. 1; and FIG. 3 is a view analogous to FIG. 1, but after emplacement of the mixer bowl.

DETAILED DESCRIPTION OF THE INVENTION

As shown in FIGS. 1 and 3, the kitchen robot 1 adapted for processing foodstuffs, comprises a housing 2 having a general L shape whose vertical portion encloses a motor group 4 having a first through vertical drive or output shaft 6 whose upper end 6a projects through a cylindrical bore 8 provided in the upper surface 10 of the housing, and whose horizontal portion constitutes a region forming a base 12 outside of which vertically projects a second drive shaft or output shaft 14.

As shown in FIGS. 1 and 3, the first and second drive shafts, respectively 6 and 14, are connected in rotation to each other, by their respective lower ends 6b;14b, by means of a reducing mechanism 16 comprising a toothed transmission belt 17 extending in a horizontal plane and which is mounted in engagement both on the large toothed wheel 18, of the driving type, supported on the lower end 6b of the drive shaft 6, and on a small toothed wheel 19, of the driven type, mounted on the lower end 14b of the drive shaft 14.

With respect to FIG. 1, the upper surface 10 of the housing 2 comprises a first input adapted to receive a first removable work accessory of so-called rapid output, such as for example a mixer bowl 22, whilst the region forming a base 12 of the housing constitutes a second input adapted to receive a second removable work accessory 24, shown in broken line on FIGS. 1 and 3, of the type comprising a bowl or working receptacle 25 with a central vertical axis XX', removably mounted on the base 12, capped by a removable cover 27 provided with a supply hopper 28, and which axially receives a rotating work tool, such as for example a vegetable chopper 31, adapted to be driven in rotation by the drive shaft 14, as shown in FIGS. 1 and 3.

With respect to FIG. 1, the mixer bowl 22 comprises a working bowl or receptacle 33 with a vertical central axis YY', which is capped by a removable cover 34 and whose bottom 35 carries a rotatable work tool 36, adapted to turn at high speed, such as an assembly of two knives, secured to a vertical shaft 38 passing through the bottom wall 35 of the bowl, along the axis YY', and which is adapted to be coupled coaxially in rotation to the drive shaft 6 of the motor group 4 by means of a coupling device, indicated by the general reference numeral 40 in FIG. 3. The bowl 33, FIGS. 1 and 3, has a sidewall 42 which is prolonged beyond the bottom wall 35 by a skirt 44 with a circular base.

As seen in FIG. 3, the mixer bowl 22 being in place on the apparatus, the coupling device 40 for the two shafts 6 and 38, respectively of the motor group 4 and of the work tool 36, comprises a flexible drive 46 comprising a rubber pinion which is fixed at its upper end of the drive shaft 6 of the motor group 4 and which is capped by a cup 48 of rigid material fixed at the end of the shaft 38 of the tool 36.

According to the invention, the bowl 33 of the rapid output work accessory, in this instance the mixer bowl 22, is removably mounted on a supporting base 50 which is traversed by the first drive shaft 6 of the motor group 4 and which, before mounting of the bowl 33 as shown in FIG. 1, is adjustably flat mounted on the upper surface 10 of the housing 2 so as to be rendered coaxial with the drive shaft 6, along the axis YY', and is fixed on the housing 2 after adjustment.

In an embodiment shown in FIGS. 1 and 2, the support base 50 is shaped as a round plate which is provided with a cylindrical central bore 52 traversed by the drive shaft 6 and which, after adjustment of the tension of the transmission belt 17 (FIG. 1) and securement of the motor group 4 in the housing 2, is positioned on the upper surface 10 of the housing centering the axis of its bore 52 relative to the drive shaft 6 of the motor group. To this end, the base 50 comprises a plurality of passage holes 53, of suitable shape, and is rendered coaxial to the drive shaft 6 by the help of any suitable centering system, of the mechanical type, such as for example a cover threaded on the shaft, or the like, such that the holes 53 come into coincidence with the so-called adjustment openings 54, preferably of an oblong shape (see FIG. 2), provided in the upper surface 10 of the housing 2. After centering the base 50 relative to the drive shaft 6 of the motor group, as shown in FIG. 2, the base 50 is fixed on the housing by means of screws 56 engaging in the openings 54 via passage holes 53, see FIG. 1.

Thus, no matter what the position taken by the drive shaft 6 of the motor group 4 upon mounting this latter in the housing 2 of the apparatus, the base 50 is thus centered on the drive shaft 6, hence along the axis YY'.

It will be understood that for another position of the drive shaft 6 than that shown in FIG. 1, the base 50 is centered on the shaft 6 with a different arrangement of its two holes 53 for passage of the screws 56 relative to the oblong coincident openings 54.

Because the random position of the drive shaft 6 of the motor group depends essentially on the adjustment of the tension of the belt 17 which extends in a horizonal plane, according to a preferred embodiment of the invention shown in FIG. 2, the oblong openings 54 and hence the corresponding holes 53 for passage of the screws, are two in number and are disposed on opposite sides of the drive shaft 6 extending in a horizontal plane parallel to that of the belt 17, such that the centering of the base 50 with respect to the shaft 6 requires only movement to the left or to the right, or conversely, of the base 50, as shown by the arrow F in FIG. 2.

After centering and fixing the base 50 on the housing 2, the emplacement of the mixing bowl 22 is carried out by securement of the skirt 44 of the bowl 33 on the support base 50 by means of any suitable reversible securement means, such for example as a bayonet system shown schematically at 58 in FIG. 3, thereby ensuring the removable securement of the bowl 33 on the base 50, see FIG. 3.

Thus, it will be understood that the base 50 being centered on the drive shaft 6 of the motor group 4, the shaft 38 of the work tool 36 is automatically axially aligned with the drive shaft 6, along the axis YY', upon the securement of the mixer bowl 22 on the base 50.

It should be emphasized that the mixer bowl 22 could be replaced by any other removable working accessory of so-called rapid output, such as for example a coffee mill, which is can be mounted on the support base of the robot, without thereby departing from the scope of the invention.

What is claimed is:

1. A kitchen robot comprising:

a housing having an upper surface, a lateral region forming a first base, and enclosing a motor group having a first vertical drive shaft projecting from the housing;

said upper surface adapted to receive a first removable work accessory comprising a bowl closed by a cover and containing a rotatable work tool secured to a vertical shaft adapted to be coupled in rotation to the first drive shaft;

a second drive shaft projecting vertically through said first base and connected in rotation to said first drive shaft by a reduction mechanism with a transmission belt; said second drive shaft adapted to receive a second removable work accessory;

a support base traversed by the first drive shaft and adjustably flat-mounted on the upper surface of the housing before mounting of the bowl, such that said support base will be coaxial to said first drive shaft, and is fixed on the housing after adjustment.

2. The kitchen robot according to claim 1, wherein the support base is fixed on the housing by screws that engage in passage holes provided in the support base, in adjustment openings provided in the upper surface of the housing.

3. The kitchen robot according to claim 2, wherein the transmission belt extends in a horizontal plane, and the adjustment openings comprise two openings having an oblong shape and are disposed on opposite sides of the first drive shaft extending in a horizontal plane parallel to that of the belt.

4. The kitchen robot according to claim 1, wherein the removable bowl has a lower portion of circular cross-section, and the support base is shaped as a round plaque adapted to fix said bowl thereon.

* * * * *